United States Patent [19]

Matsumoto

[11] Patent Number: 4,461,487
[45] Date of Patent: Jul. 24, 1984

[54] STERN TUBE SEAL

[75] Inventor: Sotosuke Matsumoto, Kawagoe, Japan

[73] Assignee: Eagle Industry Co., Ltd., Tokyo, Japan

[21] Appl. No.: 473,488

[22] Filed: Mar. 9, 1983

[30] Foreign Application Priority Data

Apr. 1, 1982 [JP] Japan .................................. 57-52309

[51] Int. Cl.³ .............................................. F16J 15/40
[52] U.S. Cl. ....................................... 277/74; 277/29; 277/96.1
[58] Field of Search ................... 277/74, 75, 29, 96 R, 277/96.1

[56] References Cited

U.S. PATENT DOCUMENTS

| 3,693,985 | 9/1972 | Dillner | 277/29 |
| 3,804,424 | 4/1974 | Gardner | 277/96.1 |
| 4,071,253 | 1/1978 | Heinen et al. | 277/74 |
| 4,406,466 | 9/1983 | Geary | 277/96.1 |
| 4,408,765 | 10/1983 | Adelmann | 277/29 |

Primary Examiner—Robert I. Smith
Attorney, Agent, or Firm—Jordan and Hamburg

[57] ABSTRACT

A stern tube seal having a fixed slidable ring and a rotatable and slidable ring in close contact and sliding with respect to the fixed slidable ring, wherein an annular groove is formed in a sliding end surface of the fixed slidable ring, a leaked liquid recovery line is disposed from the fixed slidable ring to the side of inboard, and if necessary, an annular lip portion having a pressure receiving surface disposed on the side of inboard is fitted within the annular groove.

10 Claims, 8 Drawing Figures

STERN TUBE SEAL

BACKGROUND OF THE INVENTION

The present invention relates to a stern tube seal for an oil bath system which is used as a stern tube seal device for ships.

In the past, a stern tube seal for an oil bath system has been proposed wherein a rotatable and slidable ring secured to a rotating shaft (stern tube) directly or indirectly through other members and a fixed slidable ring secured to a hull side come into sliding contact with each other at end surfaces thereof to seal both sea water and oil within the machine. In this proposal, however, it is extremely difficult to completely eliminate leakage, and no matter how the surface properties of the sliding surfaces may be improved, leakage occurs between the sliding surfaces, improvement of which has been desired.

In view of the above-described demand, it is an object of the present invention to provide a stern tube seal which enhances the performance of seal. To achieve the aforesaid object, an annular groove is formed in a sliding end surface of a fixed slidable ring, a leaked liquid recovery line is disposed from the annular groove towards inboard, and if necessary, an annular lip member having a pressure receiving surface disposed internally of the machine is fitted in the annular groove.

While the present invention has been briefly outlined, the above and other objects and advantages of the present invention will be fully understood by reading the following detailed description setting forth a preferred embodiment of the present invention in connection with the accompanying drawings. It should be noted that the drawings merely illustrate a preferred embodiment for explanation of the present invention and the scope of the present invention is not limited thereby.

DESCRIPTION OF THE PREFERRED EMBODIMENTS

Figure 1:
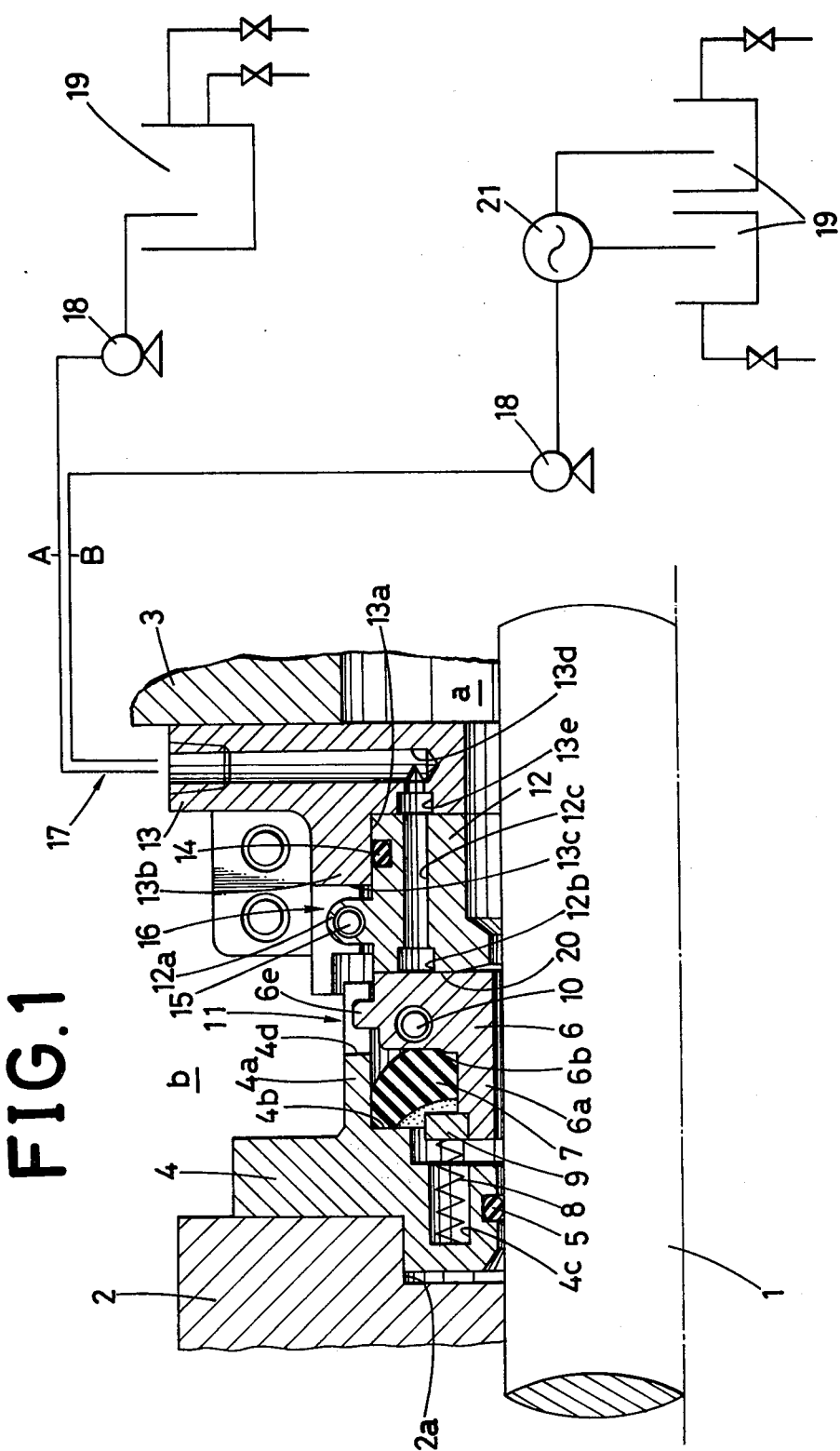
FIG. 1 is a sectional view cutaway in half showing a stern tube with a piping view of a leaked liquid recovery line.

Referring to FIG. 1, reference numeral 1 designates a rotating shaft (stern tube) having a rotating blade 2 fitted axially and frontwardly (leftwards in the drawing, which is likewise applied hereinafter) thereof, and a stern tube seal is fitted between the rotating blade 2 in the outer periphery of the rotating shaft 1 and a stern frame 3.

Reference numeral 4 designates an annular housing externally slipped over the rotating shaft 1, in which an annular projection formed integral with the front end in an inner peripheral portion thereof is fitted in an annular shoulder 2a of the rotating blade 2 and an O ring 5 is interposed between the housing and the rotating shaft 1, the housing 5 being rotated following the rotating shaft 1. The housing 4 is further integrally formed with an axially and rearwardly extending annular flange 4a. Reference numeral 6 designates a rotatable and slidable ring having a section of approximately L-shape, which can be of the splitting type wherein the ring may be split in a circumferential direction as will be described later, and whose small diameter portion (axial portion) 6a is disposed at the front end and is externally slipped over the rotating shaft 1 at the inner peripheral position of a flange 4a of the housing 4. Reference numeral 7 designates a packing formed of an elastic material such as rubber having the approximate shape of approximately a funnel, which is interposed between a shoulder 6b in the outer periphery of the rotatable and slidable ring 6 and a shoulder 4b in the inner periphery of a base of the flange 4a of the housing 4. Reference numeral 8 designates a coiled spring interposed between an annular groove 4c formed in the inner peripheral portion of the housing 4 and a retainer ring 9, the required number of coiled springs being disposed circumferentially and equidistantly, and the retainer ring 9 is fitted in a small diameter portion 6a of the rotatable and slidable ring 6 so that the coiled springs 8, 8 . . . bias the rotatable and slidable ring 6 axially and rearwardly.

Figure 2:
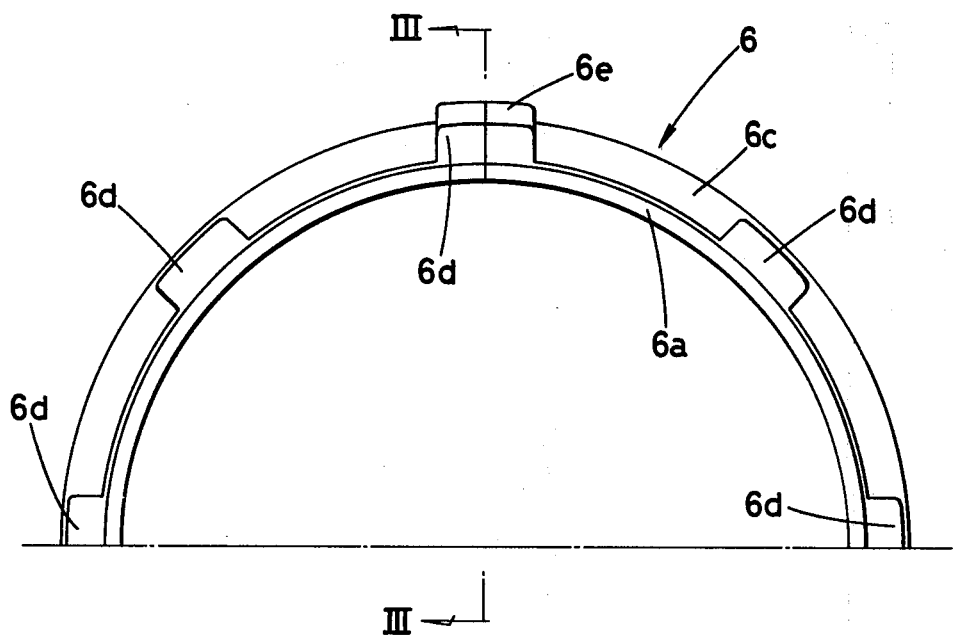
FIG. 2 is a front view cutaway in half showing a rotatable and slidable ring.
Figure 3:
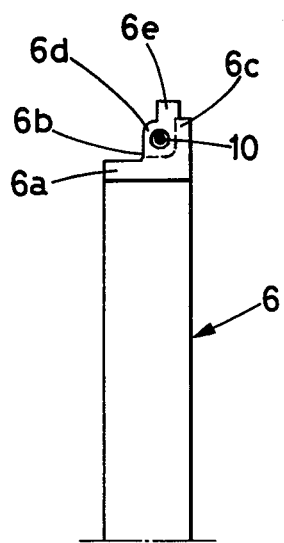
FIG. 3 is a sectional view taken along line III—III in FIG. 2.
Figure 4:
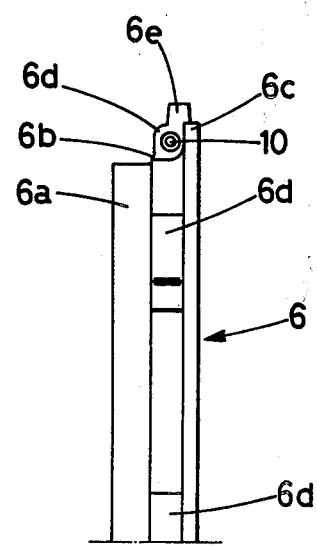
FIG. 4 is a right-hand side view cutaway in half likewise showing the rotatable and slidable ring.

As shown in FIGS. 2 to 4, the aforesaid rotatable and slidable ring 6 can be of the type in which the ring is circumferentially split into two sections, and is integrally formed with bosses 6d, 6d, . . . having a great wall thickness equidistantly disposed (divided equally in eight, in the illustrated embodiment) on the front surface of a large diameter portion (diametral portion) 6c thereof. Two bosses at a symmetrical position of 180 degrees apart of these bosses 6d . . . constitute semi-annular joining portions divided into two which are joined by means of a pin 10. The boss 6d corresponding to the joining portion is integrally formed in its outer periphery with an engaging projection 6e further projected outer-peripherally from the outer peripheral surface of the large diameter portion 6c, and the projection 6e engages a groove 4d axially formed at the extreme end of the flange 4a of the housing 4 to form engaging means 11 to impair relative rotational movement of the rotatable and slidable ring 6 and said housing 4.

Reference numeral 12 designates a fixed slidable ring which can be of the type in which the ring is split into two sections, like the rotatable and slidable ring 6, and the ring 12 is airtightly fitted with an O ring 14 in an annular shoulder 13 of a further housing 13 fixedly mounted on the stern frame 3. Reference numeral 12a designates a projection integral of the fixed slidable ring 12, the projection 12a forming a joining portion to fasten a semi-ring divided in two by means of a pin 15. The projection 12 further engages a groove 13c at the extreme end of a flange 13b integrally projected axially and forwardly from the housing 13 to constitute a further engaging means 16 at the projection 12. The engaging means 16 is provided to prevent rotation of the fixed slidable ring 12 along with the rotatable and slidable ring 6. Reference numeral 12b designates an annular groove formed in the sliding end surface of the fixed slidable ring 12 and is in communication with a communication opening 12c which is formed in approximately middle portion radially of the end surface and open to a required portion at the bottom surface thereof, the opening extending in an axial direction. This communication opening 12c is open to the end surface on the side opposite (on the rear end side) to the fixed slidable ring 12 and is in communication with an opening 13e of a recovery hole 13d of the housing 13 corresponding to the first mentioned opening, and a leaked liquid recovery line 17 starting at the communication opening 12c is connected through a pump 18 installed within the ship along line "A" and thereafter to a recovery tank 19.

The stern tube seal constructed as described hereinbefore can prevent leak-in of sea water into the machine side (a) and prevent leak-out of oil within the machine to the outside of the machine, past the sealed sliding surface 20 between the rotatable and slidable ring 6 and the fixed slidable ring 12. Depending on various conditions such as surface properties of the end surfaces of both the rings 6 and 12 and surface pressure applied to the sealed sliding surface 20, both sea water and oil gradually invade into the sealed sliding surface 20, resulting in one cause of a large amount of leakage as a result of such leakage occurring over a long period of time. However, as described above, the annular groove 12b is formed in the end surface of the fixed slidable ring 12 and the leaked liquid recovery line 17 communicates with the annular ring 12b facing inboard, and therefore, all invaded leaked liquids are recovered by the line 17 with the result that there is no possibility of leak-in and leak-out. In the liquid recovery line 17, leaked liquids are received into the recovery tank 19 by the action of a pump 18, and sea water and oil in the machine are separated due to the difference in specific gravity therebetween within the tank 19. After separation, sea water is discharged overboard whereas oil in the machine is reused or disposed as waste oil. Alternatively, the leaked liquid recovery line 17 can be connected to a de-oiler 21 and a pump 18, as shown in line "B" in FIG. 1, for direct separation between sea water and oil in the machine, which are then recovered into two recovery tanks 19 and 19.

In the present stern tube seal, as described above, sea water and oil in the machine invaded into the sealed sliding surface 20 are recovered inboard from the annular groove 12b. Thus, the seal provides an excellent sealing performance. In addition, such recovery is expected before hand and therefore, it is not necessary to completely cut off the invasion of sea water and oil in the machine into the sealed sliding surface 20, and the sealed sliding surface may be maintained in a good lubricating state by the invaded leaked liquids. While the aforesaid radial position at which the annular groove 12b is formed in the end surface of the fixed slidable ring 12 is not particularly limited, it should be noted that the annular groove can be formed at a position one third from the inner peripheral side (on the side of oil in the machine) obtained by dividing (imaginary) the end surface into three sections in a radial direction.

The rotatable and slidable ring 6 integrally formed with the bosses 6d, 6d... has a section which is approximately L-shape on the end surface of the large diameter portion. The rotatable and slidable ring 6 comprises the sealed sliding surface 20 at the end surface on the side of the large diameter portion 6c, as already described. Normally, the aforesaid end surface is subjected to lapping finishing to enhance the surface accuracy thereby enhancing the performance of the seal. On the other hand, however, the sealed sliding surface 20 always need be maintained in a good lubricating condition, and the rotatable and slidable ring 6 constructed as described above is provided to cope therewith. That is, if sliding heat is generated by sliding contact between the rotatable and slidable ring 6 and the fixed slidable ring 12, the heat gradually propagates to the whole rotatable and slidable ring 6. However, since the rotatable and sliding ring 6 is partly formed with the bosses 6d, 6d in a circumferential direction, there gives rise to a slight different in the amount of thermal expansion between the portion provided with the bosses 6d, 6d... and the portion not provided with the bosses, to thereby form a slight strain (face strain, that is, undulation) in the end surface which constitutes the sealed sliding surface 20. The rotatable and slidable ring 6 makes use of such strain to facilitate formation of a lubricating fluid film in the portion thereby enhancing the durability and PV value. In the above-described embodiment, the rotatable and slidable ring 6 is in the state where it is loosely fitted on the rotating shaft 1 and is indirectly held on the rotating shaft 1 by the elasticity the packing 7 in the shape of approximately that of a funnel formed of an elastic material such as rubber, and therefore, even if the rotating shaft 1 is relatively displaced with respect to the hull such as the stern frame 3 due to the movement of the ship or the like, the rotatable and slidable ring 6 has a sufficient following property thereto, and this following property is effective for displacement in both axial and perpendicular (diametral) directions. Further, since the rotatable and slidable ring 6 is biased by the coiled spring 8 axially and frontwardly, and therefore, the following property with respect to the axial displacement may be obtained by the coiled spring 8.

Figure 5:
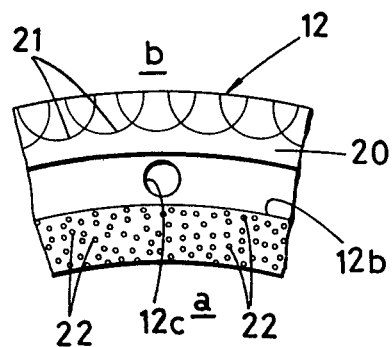
FIGS. 5 to 7 are respectively enlarged views showing a principal portion of an end surface of a fixed sliding ring.
Figure 6:
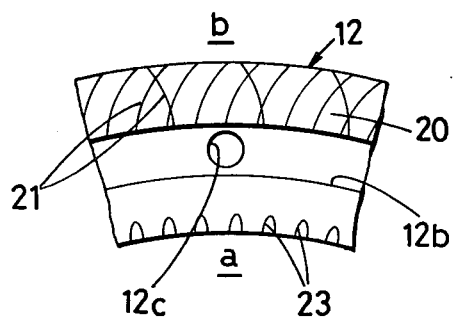
Figure 7:
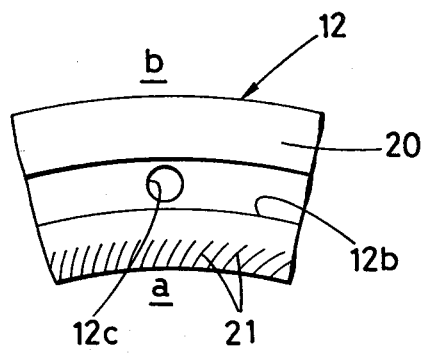

As described above, in the stern tube seal in the above-described embodiment, the sufficient following property of the rotatable and slidable ring 6 with respect to the displacement of the rotating shaft 1 to the hull is provided by the function of the packing 7 and the coiled spring 8 to increase the sealing performance, the sealed sliding surface 20 may be maintained in a good lubricating state by the face strain generated in the rotatable and slidable ring 6 to enhance the performance of durability, and even fluids (sea water and oil in the machine) intentionally introduced into the sliding surface 20 are to be recovered by the annular groove 12b of the fixed slidable ring 12, thus providing extremely excellent performances of seal and durability. Such intentional introduction of fluids into the sealed sliding surface 20 can be achieved by making use of elongated grooves 21, depressions 22 or notches 23 formed in the end surface of the fixed slidable surface 12, as shown in FIGS. 5 to 7. These elongated grooves 21 and the like have the function to introduce the fluids into the sealed sliding surface 20 by the viscous action of fluids or the like or to retain the fluids within the surface with the sliding movement between the fixed slidable ring 12 and the rotatable and slidable ring 6.

Figure 8:
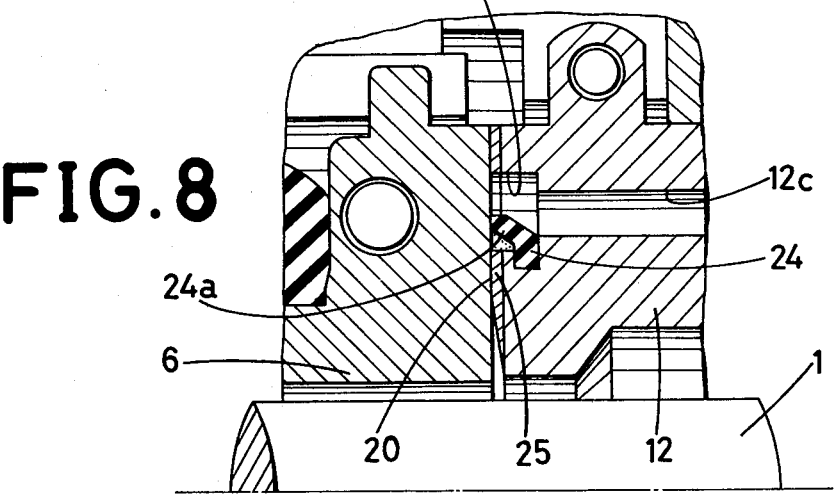
FIG. 8 is a sectional view cutaway in half showing a principal portion of a stern tube seal in accordance with a further embodiment.

Next, FIG. 8 shows a second embodiment of the present invention, which will be described in connection with only the portion thereof different from that of the previously described embodiment. In this embodiment, an annular lip member 24 having a pressure receiving surface 24a disposed on the inboard side (a) is mounted within the groove 12b of the fixed slidable ring 12 to provide a better seal within the machine. A white filling 25 is attached to the end surface of the fixed slidable ring 12 in this embodiment.

The present invention has the construction as described above, that is, the annular groove is formed in the end surface of the fixed slidable ring, the leaked liquid recovery line is disposed from the bottom surface of the annular groove toward inboard, and if necessary, the annular lip member having a pressure receiving surface disposed on the side of inboard is mounted within the annular groove. With this arrangment, the fluid invaded into the sealed sliding surface is recovered passing inboard to exhibit an excellent sealing performance, and even if (lubricating) fluids are intentionally introduced into the sealed sliding surface, such fluids may be recovered, thus making it possible to sufficiently cope with contamination of sea water which recently comprises a social problem.

While the preferred embodiments of the present invention have been described, it is obvious that many modifications and changes of the present invention may be made without departing from the principle thereof. Accordingly, all modifications and changes by which the effects of the present invention may be obtained substantially through the use of substantially identical or corresponding arrangement are understood to be included in the scope of the present invention by the following claim.

What is claimed is:

1. A stern tube seal adapted to be disposed about a rotatable shaft, comprising a housing means disposed about said shaft, a first slidable ring on said shaft, said first ring being rotatable with said shaft, biasing means between said housing means and said first ring biasing said first ring in an axial direction, a second slidable ring disposed about said shaft, said second ring being non-rotatably mounted on said shaft, said first ring having a first sealing surface disposed generally perpendicularly to the axis of said shaft, said second ring having a second sealing surface disposed generally perpendicular to the axis of said shaft, said first and second sealing surfaces facing one another to provide a seal therebetween, said second ring having an annular groove opening onto said second sealing surface, said annular groove being disposed to receive liquid leakage between said first and second sealing surfaces, passageway means in said second ring leading from said annular groove, and conduit means in communication with said passageway means for receiving said leakage whereby said leakage is carried off by said conduit means.

2. A stern tube seal according to claim 1, wherein said first slidable ring has an inner annular portion and an integrally formed outer annular portion, said outer annular portion being formed generally as a collar extending from said inner annular portion such that one side face of said collar is disposed substantially at right angles to the outer peripheral surface of said inner annular portion, and a plurality of spaced bosses integrally formed on the outer peripheral surface of side inner annular portion and integrally joined to said one side face of said collar, said first slidable ring having a longitudinal end surface contiguous with the other side face of said collar such that said end surface and said other side face of said collar define said first sealing surface, whereby the provision of said spaced bosses results in differences in thermal expansion between the sections of the first slidable ring at which said bosses are disposed and the sections between said bosses, said differences in expansion resulting in an undulation of said first sealing surface to facilitate formation of a lubricating film between said first and second sealing surfaces.

3. A stern tube seal according to claim 2, wherein two of said bosses are split bosses disposed 180 degrees apart, said first slidable ring being formed of two 180 degree sections which are joined to each other at said split bosses by pins.

4. A stern tube seal according to claim 2, wherein one of said bosses has a generally radial projection projecting beyond the outer periphery of said collar, said housing means having a groove receiving said projection to prevent relative rotational movement between said first slidable ring and said housing means.

5. A stern tube seal according to claim 2, wherein said housing means has a cylindrical portion spaced radially outwardly from said inner annular portion of said first slidable ring to thereby define a generally cylindrical space between said cylindrical portion of said housing means and said inner annular portion of said first slidable ring, said housing means having a shoulder defining one longitudinal end of said cylindrical space, and a packing ring of elastic material disposed in said cylindrical space, said packing ring having a generally arcuate cross-sectional configuration and having one end with a right angle cross-sectional configuration which fits against said shoulder and said cylindrical portion of said housing means and another end with a right angle cross-sectional configuration which fits against said collar of said first slidable ring and said inner annular portion of said first slidable ring, whereby the elasticity of said packing ring urges said first slidable ring axially toward said second slidable ring.

6. A stern tube seal according to claim 5, wherein said packing ring has a funnel-like configuration.

7. A stern tube seal according to claim 1, wherein said second slidable ring has grooves in said second sealing surface.

8. A stern tube seal according to claim 1, wherein said second slidable ring has depressions in said second sealing surface.

9. A stern tube seal according to claim 1, wherein said second slidable ring has notches in said second sealing surface.

10. A stern tube seal adapted to be disposed about a rotatable shaft, comprising a housing means disposed about said shaft, a first slidable ring on said shaft, said first ring being rotatable with said shaft, biasing means between said housing and said first ring biasing said first ring in an axial direction, a second slidable ring disposed about said shaft, said second ring being non-rotatably mounted on said shaft, said first ring having a first sealing surface disposed generally perpendicularly to the axis of said shaft, said second ring having a second sealing surface disposed generally perpendicularly to the axis of said shaft, said first and second sealing surfaces facing one another to provide a seal therebetween, said second ring having an annular groove opening onto said second sealing surface, said annular groove being disposed to receive liquid leakage between said first and second sealing surfaces, passageway means in said second ring leading from said annular groove, conduit means in communication with said passageway means for receiving said leakage whereby said leakage is carried off by said conduit means, said first slidable ring having an inner annular portion and an integrally formed outer annular portion, said outer annular portion being formed generally as a collar extending from said inner annular portion such that one side face of said collar is disposed substantially at right angles to the outer peripheral surface of said inner annular portion, a plurality of spaced bosses integrally formed on the outer peripheral surface of said inner annular portion and integrally joined to said one side face of said collar, said first slidable ring having a longitudinal end surface contiguous with the outer side face of said collar such that said end surface and said other side face of said collar define said first sealing surface, whereby the provision of said spaced bosses results in differences in thermal expansion between the sections of the first slidable ring at which said bosses are disposed and the sections between said bosses, said differences in strain resulting in an undulation of said first sealing surface to facilitate formation of a lubricating film between said first and second sealing surfaces, said housing means having a cylindrical portion spaced radially outwardly from said inner annular portion of said first slidable ring to thereby define a generally cylindrical space between said cylindrical portion of said housing means and said inner annular portion of said first slidable ring, said housing means having a shoulder defining one longitudinal end of said cylindrical space, and a packing ring of elastic material disposed in said cylindrical space, said packing ring having a generally arcuate cross-sectional configuration and having one end with a right angle cross-sectional configuration which fits against said shoulder and said cylindrical portion of said housing means and another end with a right angle cross-sectional configuration which fits against said collar of said first slidable ring and said inner annular portion of said first slidable ring, whereby the elasticity of said packing ring urges said first slidable ring axially toward said second slidable ring.

* * * * *